United States Patent

Won et al.

[11] Patent Number: 5,991,636
[45] Date of Patent: Nov. 23, 1999

[54] ADAPTIVE POWER CONTROL METHOD FOR A CDMA MOBILE RADIO TELEPHONE SYSTEM

[75] Inventors: Seok-Ho Won; In-Myoung Jeong; Whan-Woo Kim; Duck-Bin Im, all of Daejon, Rep. of Korea

[73] Assignee: Electronics and Telecommunications Research Institute, Daejon, Rep. of Korea

[21] Appl. No.: 08/915,945

[22] Filed: Aug. 21, 1997

[30] Foreign Application Priority Data

Aug. 21, 1996 [KR] Rep. of Korea ...................... 96-34590

[51] Int. Cl.$^6$ ............................... H04B 7/005; H04Q 7/20
[52] U.S. Cl. ............................................... 455/522; 455/69
[58] Field of Search ............................. 455/522, 69, 422, 455/517; 370/342

[56] References Cited

U.S. PATENT DOCUMENTS 5,267,262  11/1993  Wheatley, III ............................ 455/69
5,539,728  7/1996  Gaiani et al. .............................. 455/69

OTHER PUBLICATIONS

Tanskanen, J.M.A., et al. Prediction of Received Signal Power in CDMA Cellular Systems, IEEE, 1995, pp. 922–926.

Primary Examiner—Nguyen Vo
Attorney, Agent, or Firm—Cohen, Pontani, Lieberman & Pavane

[57] ABSTRACT

An adaptive power control method for a CDMA mobile radio telephone system is disclosed which operates similarly to a fixed increment and decrement power control method in the portion where the slope of the channel signal due to a fading effect is steep when the transmission power of a mobile station is adjusted. In the portion where the slope of the channel signal is gentle, like the peak portion of the channel signal, the granular noise can be improved by using the Jayant's equations. In accordance with the present invention, the fading effect in the mobile radio channel can be efficiently compensated without giving much load to a forward link since a mobile station determines the variation of the backward channel signal by using the statistical characteristics of a power control command (1 bit) transmitted from a base station. Further, an amount of interferences among a plurality of users can be reduced because the variation (variance) of a receiving power at the base station caused by the fading effect in each mobile station is made small. Thus, the overall performance of the system can be significantly improved in accordance with the present invention.

1 Claim, 6 Drawing Sheets

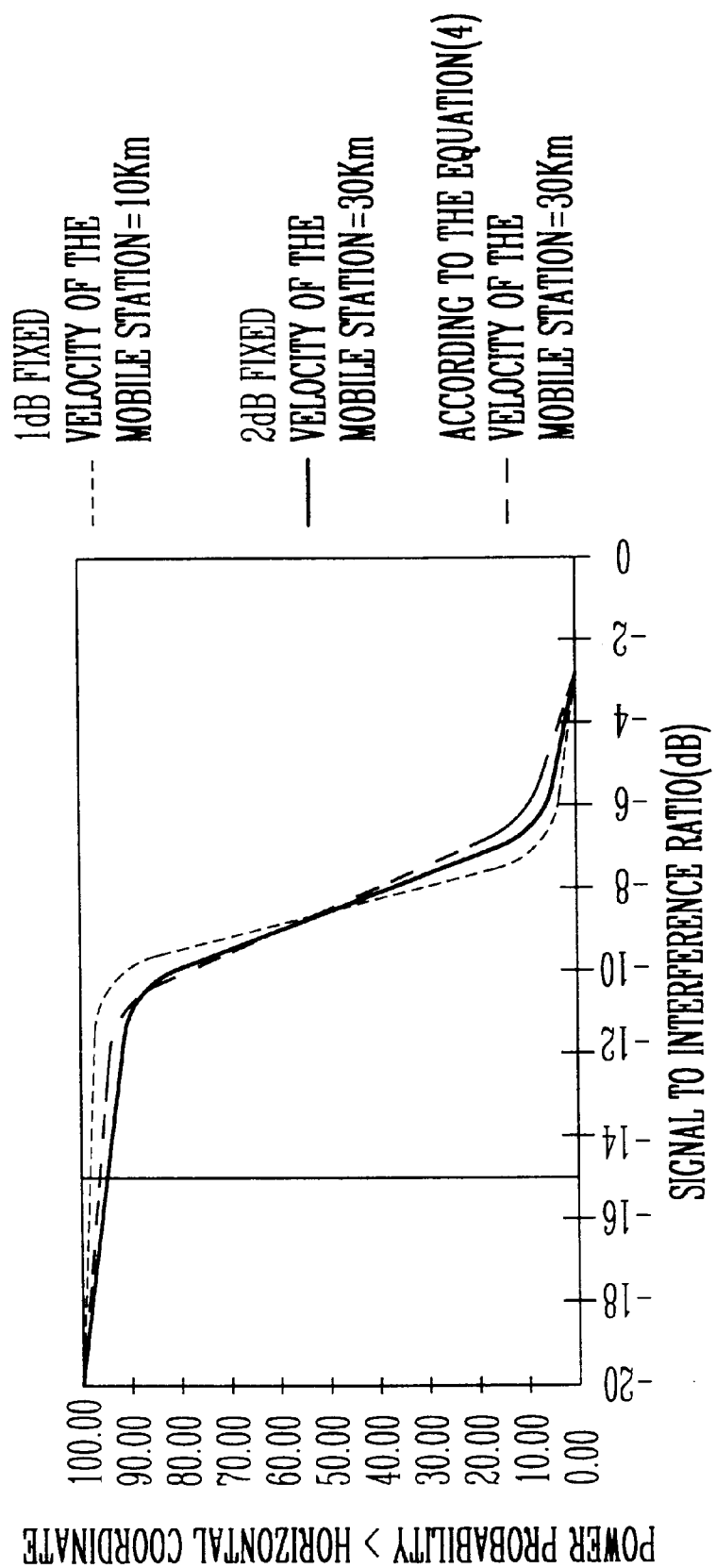

ADAPTIVE POWER CONTROL METHOD FOR A CDMA MOBILE RADIO TELEPHONE SYSTEM

BACKGROUND OF THE INVENTION

1. Field of the Invention

The present invention relates to an adaptive power control method for a code division multiple access (CDMA) mobile radio telephone system.

2. Description of the Related Art

With a fixed increment and decrement closed circuit power control method as used in the conventional IS-95, and the like, the structure of the control circuit can be simplified. However, the conventional method has a drawback that a power increment and decrement adjustment is made unnecessarily large when the variation of a channel signal is small while it is too small when the variation of the channel signal is large.

SUMMARY OF THE INVENTION

It is therefore an object of the present invention to provide a simple method for adaptively varying a power control increment and decrement adjustment of a mobile station according to the variation of a channel signal.

It is another object of the present invention to provide a method for adaptively controlling a power control increment and decrement adjustment of a mobile station which can efficiently overcome a fading effect resulting from a mobile radio channel and effectively compensate for a short duration fading such as a doppler fading of a backward mobile radio channel (channel from a mobile station to a base station).

In accordance with one aspect of the present invention to achieve the afore-mentioned object, a method for adaprively controlling a power control increment and decrement for a code division multiple access mobile radio telephone system is provided which is characterized in that the power control increment and decrement is obtained according to an amount of the varation of a channel signal and from the following equations:

$$P_i = P_0 + \sum_{j=1}^{i} D_j$$

$$D_j = L \cdot K^{C_j \cdot j - 1} \quad \text{for } C_j + C_{j-1} + C_{j-2} = 3 \text{ or}$$

$$D_j = D_{j-1} \cdot K^{C_j \cdot j - 1} \quad \text{for } C_j + C_{j-1} + C_{j-2} \neq 3$$

where $P_i$ is the ith transmission power of a mobile station which is determined by a adjustment according to a power increment and decrement command, $P_o$ is the initial power of the mobile station, $D_j$ is the jth power control increment and decrement as determened at the mobile station, $C_j = \pm 1$, L is a constant, and K is a variable which takes a constant $K_1$ for $C_{j-1} \cdot C_j = 1$, and takes a constant $k_2$ for $C_{j-1} \cdot C_j = -1$.

BRIEF DESCRIPTION OF THE DRAWINGS

The present invention will become more apparent upon a detailed description of the preferred embodiments for carrying out the invention as rendered below. In the description to follow, references will be made to the accompanying drawings, where like reference numerals are used to identify like or similar elements in the various drawings and in which:

FIG. 6 is a graph which illustrates the probability of an outage in the present invention together with that in the conventional fixed increment power control method under the presence of interferences.

DETAILED DESCRIPTION OF THE INVENTION

Figure 1:
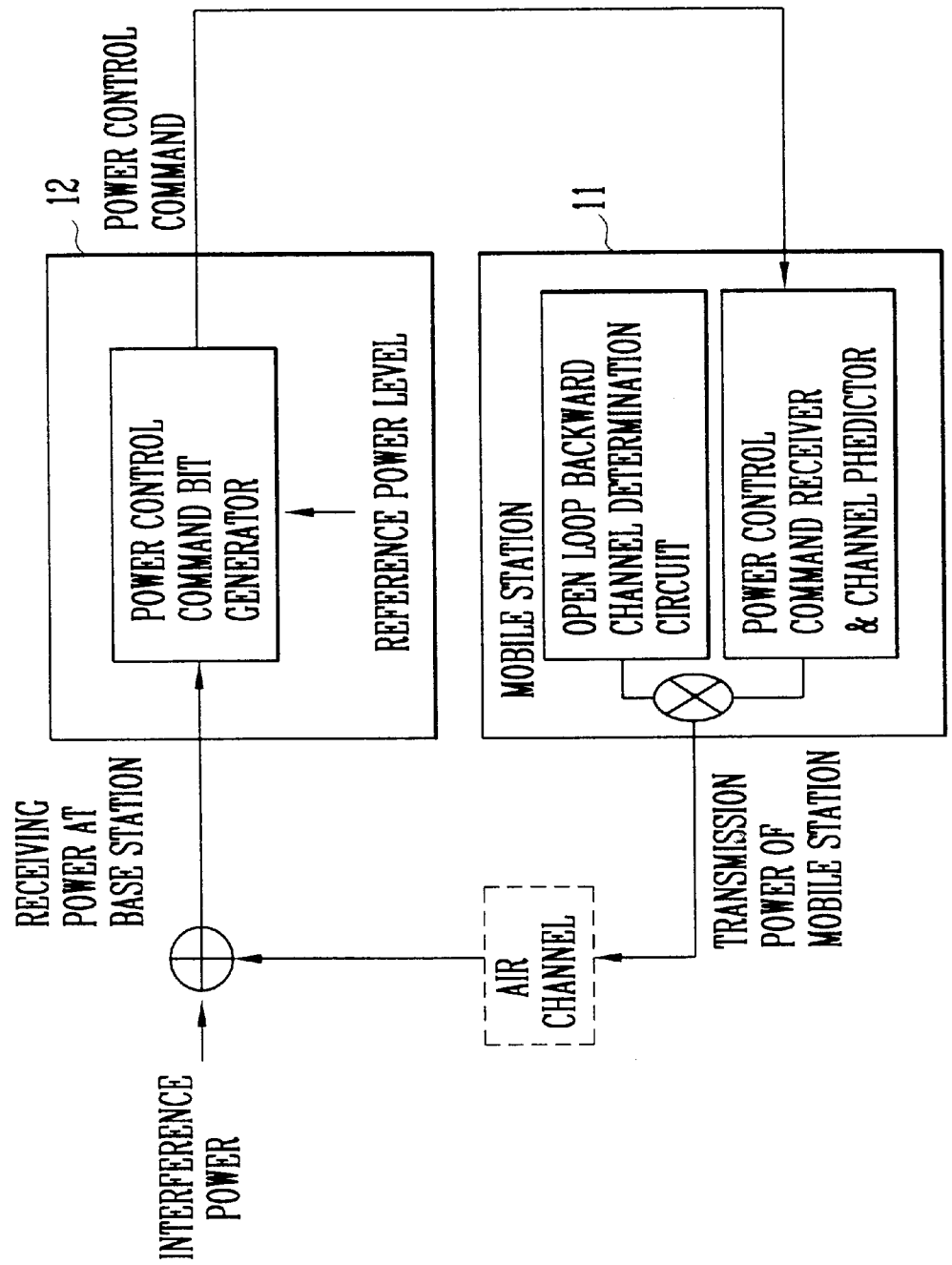
FIG. 1 is a block diagram of a power control loop used in a CDMA system.

Referring now to FIG. 1, there is shown a block diagram of a power control loop used in a CDMA system. A base station receives a signal transmitted from a mobile station, compares it with a reference value, and generates a power control increment and decrement command. The mobile station receives the command from the base station and adjusts its transmission power. The transmission power of the mobile station is determined by the equation (1) below.

$$P_{tx}^m(t) = K - P_{rx}^m(1 - e^{-t/\tau}) + \text{Tx\_Gain\_Adj} \quad (1)$$

where K is a constant, $P_{rx}^m$ is a receiving power at the mobile station, $P_{tx}^m$ is a transmission power of the mobile station, $\tau$ is a open circuit power control time constant, and Tx_Gain_Adj is an adjustment according to the power increment and decrement command.

When $C_i$ is defined as a power control increment and decrement command transmitted in the ith sequence from the base station, the ith transmission power of the mobile station, which was determined by Tx_Gain_Adj in the conventional fixed power control method, is represented by the equation (2) below.

$$P_i = P_o + \Sigma_{j=1}^{i}(C_j \cdot \text{step}) \text{ [dB]} \quad (2)$$

where $C_j = \pm 1$, step=1 [dB], and $P_o$ is the initial power of the mobile station.

Variation of transmittion power of mobility station according to the varition of channel signal showed by eguation 1 and 2.

Figure 2:
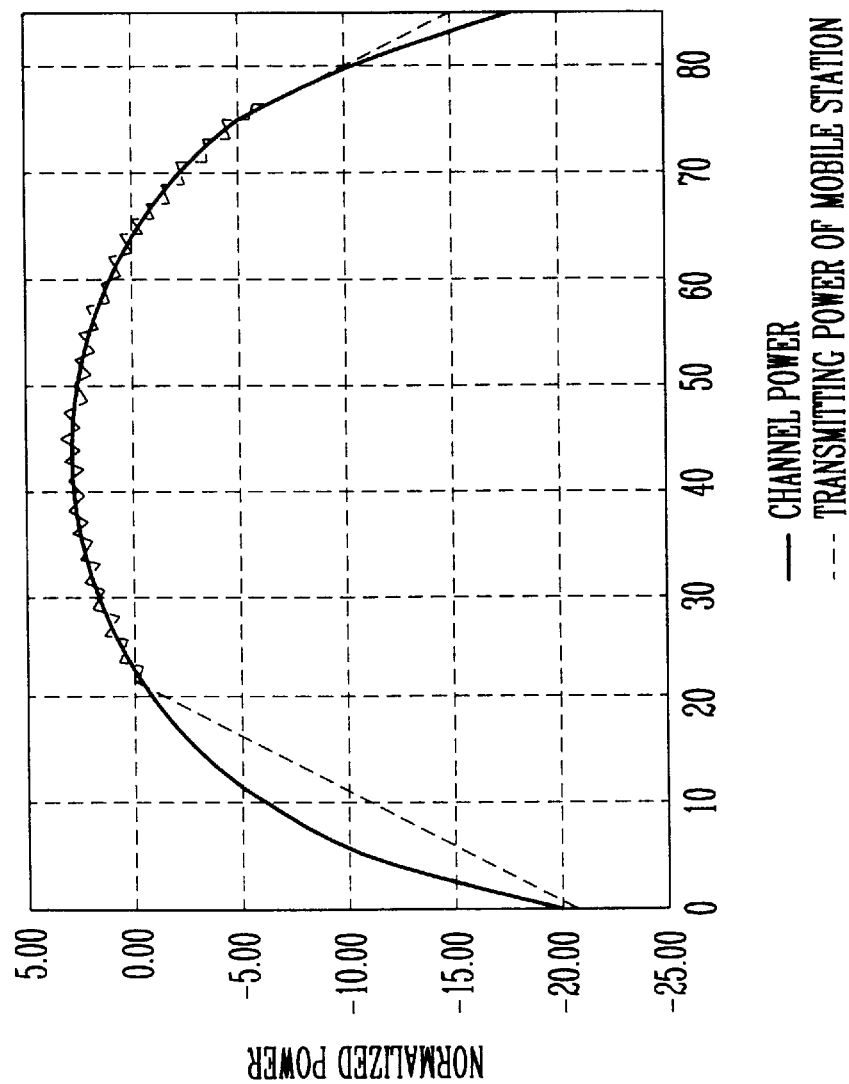
FIG. 2 illustrates the variation of the transmission power of a mobile station according to the variation of a channel signal in the conventional 1 dB fixed increment and decrement power control method when the mobile station moves at the velocity of 10 Km/hour.

FIG. 2 illustrates the variation of the transmission power of a mobile station according to the variation of a channel signal in the conventional 1 dB fixed increment and decrement power control method when the mobile station moves at the velocity of 10 Km/hour. When the increment and decrement is 1 dB, a slope underload distortion occurs because the transmission signal of the mobile station cannot keep track of the slope of the variation of the channel signal during the interval of 1 to 30 samples.

Figure 3:
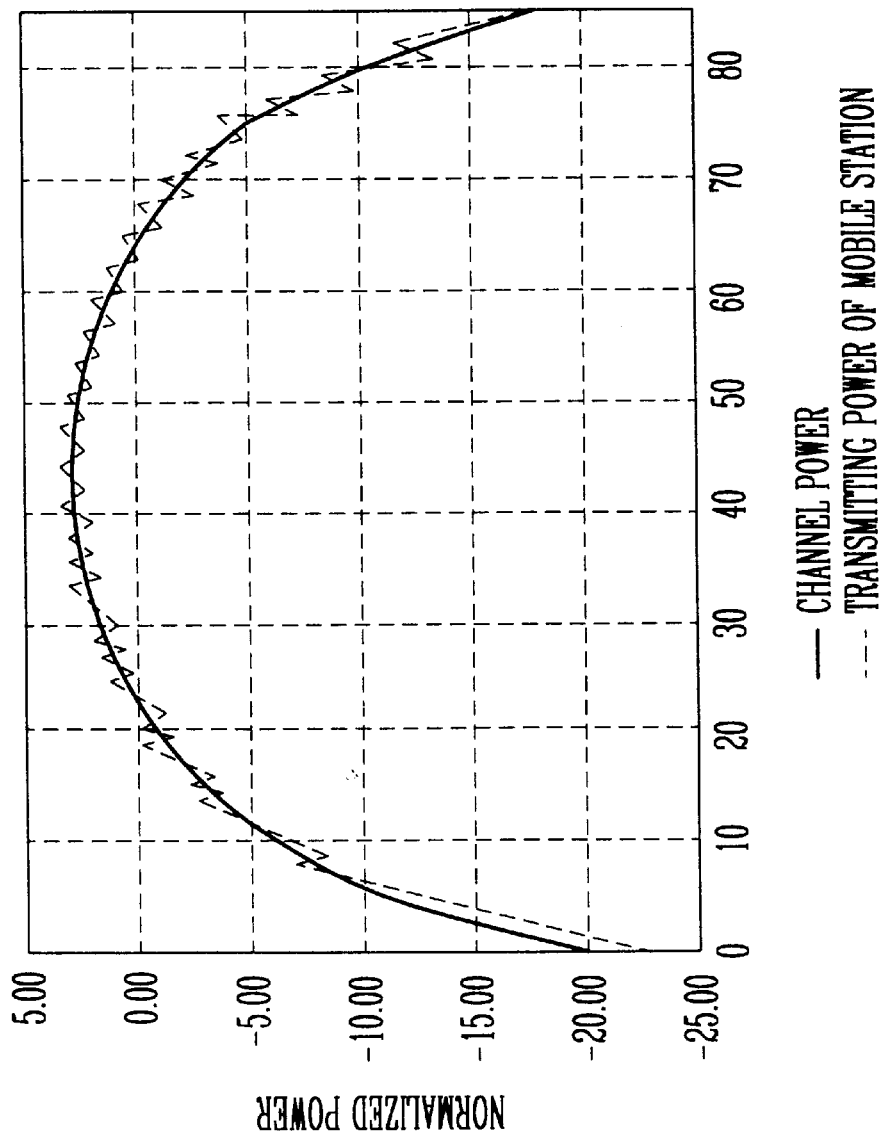
FIG. 3 illustrates the variation of the transmission power of a mobile station according to the variation of a channel signal in the conventional 2 dB fixed increment and decrement power control method when the mobile station moves at the velocity of 10 Km/hour.

FIG. 3 illustrates the variation of the transmission power of a mobile station according to the variation of a channel signal in the conventional 2 dB fixed increment and decrement power control method when the mobile station moves at the velocity of 10 Km/hour. When the fixed increment and decrement is set to 2 or 3 dB at the mobile station, the slope underload distortion can be improved. However, in this case, a granular noise is generated because the transmission power of the mobile station oscillates between 2 and 3 dB at the peak of the channel signal (during the interval of 31 to 60 samples).

Figure 4:
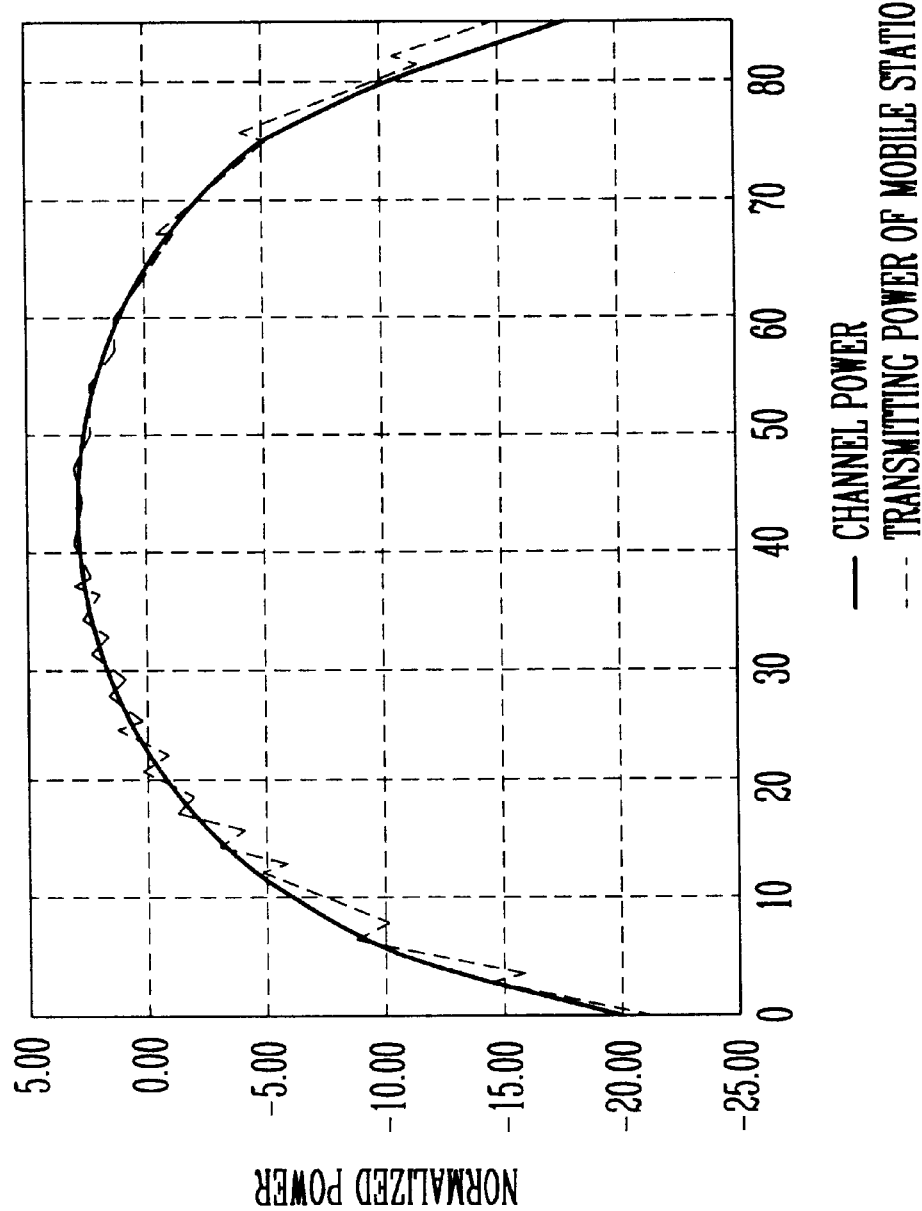
FIG. 4 illustrates the variation of the transmission power of a mobile station according to the variation of a channel signal in the power control method using the Jayant's equation with K=1.2 when the mobile station moves at the velocity of 10 Km/hour.

Among the typical methods which can improve both the slope underload distortion and the granular noise, there is a method proposed by Jayant which can be applied in an adaptive delta modulation (ADM). The result obtained when the Jayant's equation as represented by the equations (3) and (4) below is applied to the variation of the channel signal as illustrated in FIGS. 2 and 3 is shown in table 1. Table 1 shows the power control errors when the Jayant's equation (3) is applied for various values of K. The result obtained when the optimum value of K (K=1.2) is applied is shown in FIG. 4.

$$P_i = P_o + \Sigma_{j-1}{}^i D_j \quad (3)$$

where $D_j$ is the jth power control increment and decrement.

$$D_j = D_{j-1} \cdot K^{C_j - C_{j-1}} \quad (4)$$

where K is a constant.

TABLE 1

| K | 1.0 | 1.1 | 1.2 | 1.3 | 1.4 | 1.5 |
|---|---|---|---|---|---|---|
| power control error | 1.26 | 1.1 | 0.91 | 0.96 | 0.96 | 0.97 |

FIG. 4 illustrates the variation of the transmission power of a mobile station according to the variation of a channel signal in the power control method using the Jayant's equation with K=1.2 when the mobile station moves at the velocity of 10 Km/hour. From FIG. 4, it may be readily appreciated that the slope underload distortion increases depending on the characteristics of the variation of the channel signal, and only the granular noise is improved.

Figure 5:
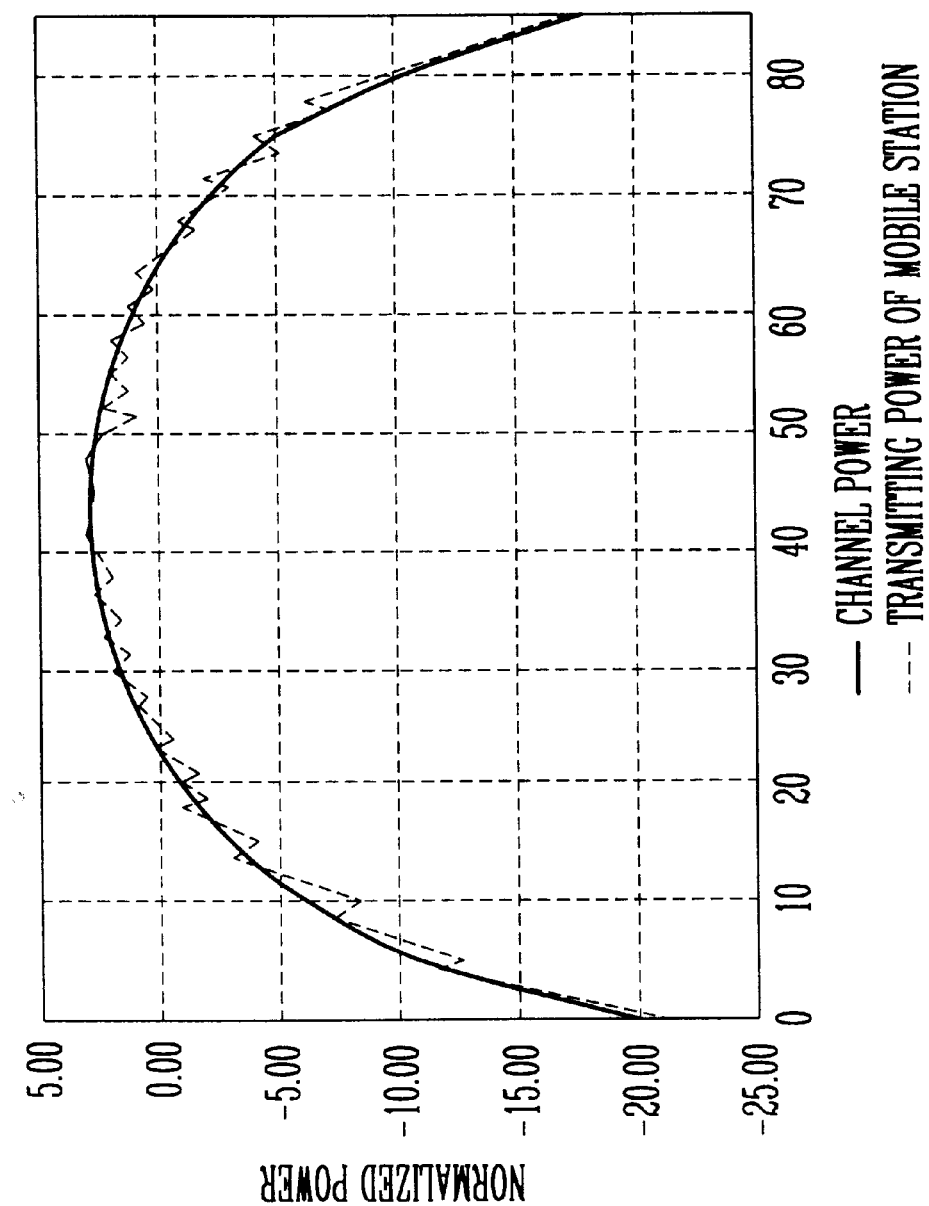
FIG. 5 illustrates the variation of the transmission power of a mobile station according to the variation of a channel signal in the power control method of the present invention using the modified Jayant's equation with K1=1.05, K2=1.15 and L=2 when the mobile station moves at the velocity of 10 Km/hour.

FIG. 5 illustrates the variation of the transmission power of a mobile station according to the variation of a channel signal in the power control method of the present invention using the modified Jayant's equation with K1=1.05, K2=1.15 and L=2 when the mobile station moves at the velocity of 10 Km/hour. As shown in FIG. 5, the method in accordance with the present invention operates similarly to the fixed increment and decrement power control method in the portion where the slope of the channel signal is steep. In this signal portion, the slope underload distortion can be significantly improved. Also, in the portion where the slope of the channel signal is gentle, like the peak portion of the channel signal, the granular noise can be improved by using the Jayant's equations (3) and (4).

$$P_i = P_o + \Sigma_{j-1}{}^i D_j \quad (5)$$

$$D = L \cdot K^{C_j - C_{j-1}}$$

for $$C_i + C_{j-1} + C_{j-2} = 3 \quad (6)$$

or $$D = D_{j-1} \cdot K^{C_j - C_{j-1}}$$

for $$C_j + C_{j-1} + C_{j-2} \neq 3$$

where $P_i$ is the ith transmission power of the mobile station which is determined by an adjustment according to a power increment and decrement command, $P_o$ is the initial power of the mobile station, $D_j$ is the jth power control increment and decrement as determined at the mobile station, $C_j = \pm 1$, L is a constant, and K is a variable which takes a constant $K_1$ for $C_{j-1} \cdot C_j = 1$ and takes a constant $K_2$ for $C_{j-1} \cdot C_j = -1$.

In order to verify the simulation result, the operation of each method was observed under the condition that there is no short duration fading and only an Additive White Gaussian Noise (AWGN) exists. The power control error was confirmed to be within ½ of the increment and decrement. Particularly, with the present invention, the power control error was very small. The observed data is shown in table 2 below.

TABLE 2

|  | fixed power control | | | present invention |
|---|---|---|---|---|
|  | 1 dB step | 2 dB step | 3 dB step |  |
| power control error | 0.52 dB | 1.01 dB | 1.54 dB | 0.048 dB |

The power control in the IS-95 is performed by using a fixed increment and decrement power control method wherein the transmission power of a mobile station is increased by 1 dB during 1.25 msec. This sufficiently compensates for a slow-speed fading occurring when the velocity of the mobile station is below 0–16 Km/hour. However, when the velocity of the mobile station exceeds 16 Km/hour, the power control no longer keeps track of the fading, and the duration for which the fading is deep persists for a long time so that a long burst error is more likely to occur. Thus, since it is difficult for an interleaver to distribute errors over a wide range, a Viterbi decoder may not be expected to improve the performance. If the velocity of the mobile station exceeds 32 Km/hour, the performance of the Viterbi decoder can be recovered by the operation of the interleaver since the duration of a fading is short. However, in this case, the power control cannot still keep track of the fading. The IS-95 power control exhibits its best performance only when the velocity of the mobile station is below 0–16 Km/hour. In order to verify the range over which the power control according to the present invention maintains its full performance, the power control errors with respect to the variations of channel signals when the mobile station moves at constant velocities of 5–40 Km/hour and when the velocity of the mobile station varies from 10 Km/hour to 30 Km/hour were shown in tables 3 and 4, respectively.

TABLE 3

| velocity of mobile station power increment and decrement | 5 Km | 10 Km | 15 Km | 20 Km | 25 Km | 30 Km | 35 Km | 40 Km |
|---|---|---|---|---|---|---|---|---|
| 1dB(fixed) | 0.81 | 1.15 | 1.59 | 2.04 | 2.38 | 2.68 | 2.95 | 3.20 |
| 2dB(fixed) | 1.22 | 1.33 | 1.49 | 1.67 | 1.91 | 2.08 | 2.39 | 2.54 |
| present invention | 0.86 | 1.04 | 1.30 | 1.54 | 1.73 | 1.91 | 2.09 | 2.38 |

In table 3, the limit of the velocity of the mobile station over which the power control error is below 2 dB is up to about 20 Km/hour, when the fixed increment and decrement is 1 dB. When the fixed increment and decrement is 2 dB, the above limit is up to about 30 Km. For the present invention, the above limit is up to 35 Km. For all the variations of channel signals, the power control error was improved by more than 0.5 dB. Particularly, when the velocity of the mobile station continuously varies from 10 Km/hour to 30 Km/hour, the improvement of the power control error was more than 1 dB at the maximum as shown in table 4.

TABLE 4

| power control increment and decrement | power control error |
|---|---|
| 1 dB (fixed) | 2.47 dB |
| 2 dB (fixed) | 1.74 dB |
| invention | 1.45 dB |

In order to analyze the performances of the various power control mothods under the presence of interferences, the probability that a Signal to Interference Ratio (SIR) is below −15 dB under the presence of the interference of 10 dB is shown in FIG. 6 and table 5. When the velocity of the mobile station is 10 Km/hour, an outage of below 1% is produced for all the methods. The 1 dB fixed increment and decrement power control method produces an outage of 4.8% when the velocity of the mobile station is 30 Km/hour, while for the present invention, only an outage of 1.35% was produced for the mobile station's velocity of 30 Km/hour.

TABLE 5

| power increment and decrement | velocity of mobile station | | |
|---|---|---|---|
| | 10 Km | 20 Km | 30 Km |
| 1 dB (fixed) | 0.44 | 2.01 | 4.80 |
| 2 dB (fixed) | 0.64 | 0.70 | 1.96 |
| present invention | 0.10 | 0.50 | 1.35 |

As described above, a fading effect can be efficiently compensated without giving much load to a forward link in accordance with the present invention since a mobile station determines the variation of the backward channel signal by using the statistical characteristics of a power control command (1 bit) transmitted from a base station. Further, an amount of interferences among a plurality of users can be reduced because the variation (variance) of a receiving power at the base station caused by a fading in each mobile station is made small. Thus, the overall performance of the system can be significantly improved.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A method for adaptively controlling power to a code division multiple access mobile radio telephone system, comprising the step of:

adjusting the power to the code division multiple access mobile radio telephone system based on an amount of variation of a channel signal and the equation $$P_i = P_o + \Sigma_{j=1}^{i} D_j$$

where $$D_j = L \cdot K^{C_j \cdot C_{j-1}}$$

if $$C_j + C_{j-1} + C_{j-2} = 3;$$

$$D_j = D_{j-1} \cdot K^{C_j \cdot C_{j-1}}$$

if $$C_j + C_{j-1} + C_{j-2} \neq 3;$$

$P_i$ is an ith transmission power of a mobile station determined based on a power control signal;

$P_o$ is an initial power of the mobile station;

$D_j$ is a jth power control adjustment as determined at the mobile station;

$C_j = \pm 1$;

L is a constant,

K=a constant $K_1$ if $C_{j-1} \cdot C_j = 1$

K=a constant $K_2$ if $C_{j-1} \cdot C_j = -1$.

* * * * *